No. 696,876. Patented Apr. 1, 1902.
E. B. LYDICK.
BROILER OR TOASTER.
(Application filed July 26, 1901.)
(No Model.)
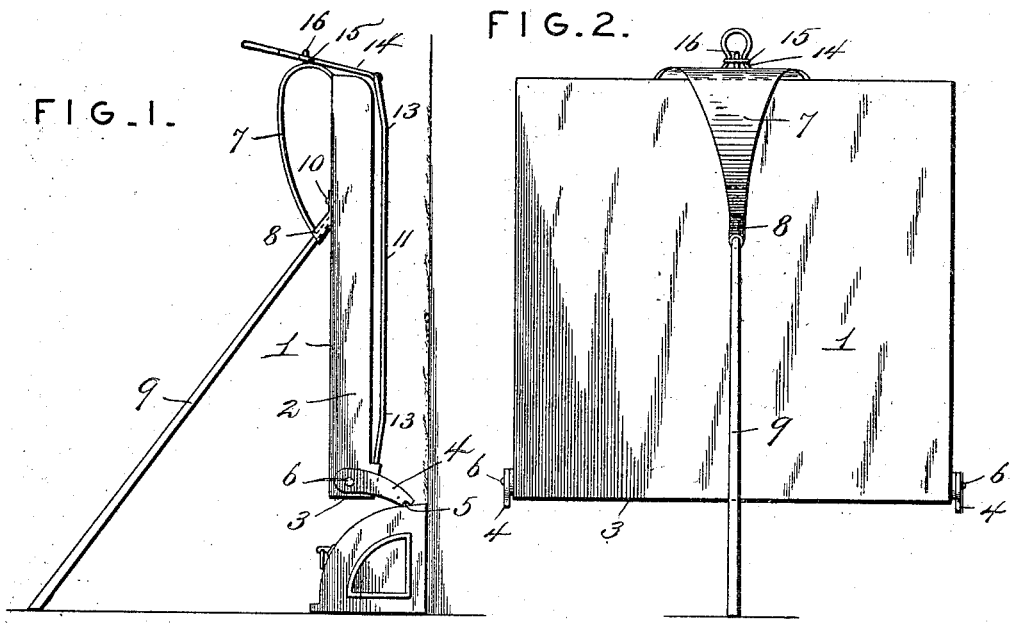
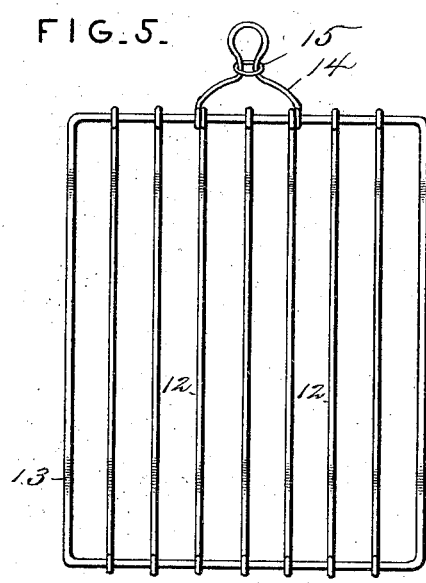
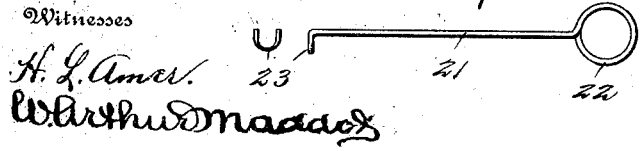
Witnesses
H. L. Amer.
W. Arthur Maddox
Inventor
Ernest B. Lydick.
By Victor J. Evans.
Attorney

UNITED STATES PATENT OFFICE.

ERNEST B. LYDICK, OF PITTSBURG, PENNSYLVANIA.

BROILER OR TOASTER.

SPECIFICATION forming part of Letters Patent No. 696,876, dated April 1, 1902.

Application filed July 26, 1901. Serial No. 69,824. (No model.)

*To all whom it may concern:*

Be it known that I, ERNEST B. LYDICK, a citizen of the United States, residing at Pittsburg, in the county of Allegheny and State of Pennsylvania, have invented new and useful Improvements in Broilers or Toasters, of which the following is a specification.

This invention relates to broilers and toasters, the object in view being to provide a device of the character referred to which is especially designed for light-housekeeping purposes and adapted to broil all kinds of meat, fish, and game, as well as to toast bread, mush, potato-cakes, and the like. The article is of such construction that the excess of fat and juices drains into a trough at the lower end of the article, where such juices are protected in a measure from the direct action of the fire and allowed to boil in order to form gravy. The construction of the article is such that it may be readily cleaned as easily as an ordinary pan or tray.

The device is especially adapted for use in front of open grates, stoves, and fireplaces, being adapted to be supported in parallel relation to the surface of the grate or stove.

Another object of the invention is to provide what I term a "reversible" grid, which by reason of its shape and connection with the main body of the receptacle is adapted to hold substances of different thicknesses while the same are being subjected to the action of the fire.

With the above and other objects in view, the nature of which will appear more fully as the description proceeds, the invention consists in the novel construction, combination, and arrangement of parts hereinafter fully described, illustrated, and claimed.

In the accompanying drawings, Figure 1 is a side or edge view of the broiler and toaster, showing the same supported vertically in front of an open fireplace. Fig. 2 is an elevation looking toward the outer side thereof. Fig. 3 is a top plan view of the broiler and toaster with the handle in section. Fig. 4 is a sectional side view of the article, illustrating the application thereto of an auxiliary guard which is employed when broiling or toasting soft substances. Fig. 5 is a plan view of the grid. Fig. 6 is a detail perspective view of the detachable guard. Fig. 7 is a detail view of the scraper for cleaning the grid.

Like numerals of reference denote like parts in all the views.

The broiler and toaster contemplated in this invention comprises, essentially, a tray-like receptacle 1, having side flanges 2 and a trough 3 arranged at one end of the receptacle, said trough being located at the lower end of the broiler when the same is mounted in position in front of the fireplace, as shown in Fig. 1, the device as a whole being designed to extend in parallel relation to the exposed surface of the stove or grate.

In order to support the broiler in proper relation to the fire, the receptacle 1 is provided at its lower end with laterally-projecting feet 4 of such length as to hold the broiler at the required distance from the fire, and said feet are provided with terminal notches 5, by means of which they may be engaged with and adapted to rest upon the lower bar of a grate or the andirons, as may be preferred.

The receptacle 1 is preferably formed of sheet metal, the same being bent to form the trough 3 and the flanges thereof being riveted together, as shown at 6, the rivets also serving to connect the feet 4 with the receptacle. The upper portion of the receptacle 1 is provided with a curved integral extension or handle 7, which is bent back behind the receptacle and provided at its extremity with a sleeve or ferrule 8, which forms an inclined socket adapted to receive one end of a prop or brace 9, the opposite end of which is designed to rest upon the floor or hearth for the purpose of supporting the device as a whole in proper relation to the fireplace. The sleeve or socket-piece 8 is provided with a terminal loop 10, by means of which the handle and socket are both rigidly united with the aid of a rivet or other suitable fastener to the body of the receptacle 1, as clearly shown in Figs. 1 and 2.

The open side of the receptacle when in use is covered by means of a grid 11, consisting of a rectangular wire frame crossed by a plurality of parallel bars 12. The frame of the grid, as well as the bars 12, are bent intermediate their ends, as shown at 13, so as to set off the main body of the grid in order to hold substances of different thicknesses within the receptacle by the pressure of the grid against such substances. The width of the grid is such that the lower end thereof may be inserted in the trough 3 while the upper end of the grid is held by means of a bail 14, pivotally connected to the grid and provided with a retaining-loop 15, which is adapted to be slipped over a pin or stud 16, projecting upward from the handle 7, as clearly illustrated in Figs. 1 and 2.

The article, as thus far described, is especially adapted for broiling meat and toasting bread and the like. In order to adapt the device for broiling or toasting soft substances, I provide a detachable guard 17, illustrated in detail in Fig. 6 and shown applied in Fig. 4. The guard 17 is formed of sheet metal and is substantially L-shaped in cross-section. This guard is adapted to extend transversely across the lower portion of the receptacle between the flanges or sides 2 and is provided with end flanges 18, which are formed with notches 19, adapted to receive and engage the edge of the trough, as shown in Fig. 4, the notching of the flanges forming fingers 20, adapted to engage within the edge of the trough, as shown. The guard 17 forms a support for the soft substances placed within the broiler and toaster and prevents the same from dropping downward into the trough 3, which is thus left free to receive the juices or liquid draining from the substance or substances being cooked.

In Fig. 7 I have shown a releasing-bar 21 and which is preferably formed of a piece of wire provided at one end with a handle or finger-loop 22 and formed at its opposite end into U shape, as shown at 23. The U-shaped end portion of the releasing-bar is adapted to be inserted under the bars of the grid and moved lengthwise thereof, so as to loosen the cooked substance from the grid-bars preparatory to opening or detaching the grid and removing the contents of the receptacle.

The broiler and toaster may be adjusted to any angle, so as to bring the same into parallel relation to the front of the fireplace or stove, by using props or supports 9 of different lengths. Such prop or support may consist of a wooden stick, and the same may be cut to the length desired.

In broiling meat the juices flow downward and are caught in the trough 3, where they are boiled, and serve as gravy or dressing for the meat. The trough by reason of its shape serves to screen the juices from the direct action of the fire.

The broiler and toaster will of course be made in different sizes and will be found especially useful for light housekeeping, being adapted to broil all kinds of meat, fish, and game, and to toast bread, mush, and various other substances. It will also be seen that by reason of the simplicity of construction the broiler and toaster may be quickly and easily cleaned.

I do not desire to be limited to the details of construction and arrangement hereinabove set forth, and accordingly reserve the right to change, modify, or vary the construction within the scope of the appended claims.

Having thus described the invention, what is claimed, and desired to be secured by Letters Patent, is—

1. A broiler and toaster comprising a receptacle closed at one side and open at the other, a trough arranged at one end of the receptacle, a detachable grid for the open side of the receptacle adapted to have one end inserted in the trough, and a bail for securing the opposite or free end of the grid to the receptacle.

2. A broiler and toaster comprising a receptacle provided at its lower end with a drain-trough, a detachable grid for closing the open side of the receptacle, a bail pivotally connected to the grid and adapted to secure the same to the receptacle, and feet at one end of the receptacle for supporting the same in front of a fireplace, said grid being offset intermediate its ends and made reversible so that either side may be presented toward the open side of the receptacle.

3. A broiler and toaster comprising a receptacle, supporting-feet arranged at one end thereof, a detachable grid for covering the open side of the receptacle, means for securing said grid to the receptacle, and a handle on the receptacle provided with a socket to receive a suitable prop or brace.

4. A broiler and toaster comprising a receptacle, a reversible grid for covering the open side of the receptacle, feet for supporting the receptacle in a substantially vertical position in front of a fireplace, a handle on the receptacle provided with a socket adapted to receive a suitable brace or prop, and a pivoted bail on the grid adapted to engage a pin or stud on the handle of the receptacle.

5. A broiler and toaster comprising a receptacle, means for holding said receptacle in a substantially vertical position in front of a fireplace, a drain-trough at the lower end of the receptacle, a detachable grid for closing the open side of the receptacle, and a detachable guard adapted to extend across the lower portion of the receptacle and cover the drain-trough.

In testimony whereof I affix my signature in presence of two witnesses.

ERNEST B. LYDICK.

Witnesses:
JEANNETTE DE LOUNY,
BELLE McCULLOCH.